(12) United States Patent
Messersmith (10) Patent No.: US 6,803,741 B2
(45) Date of Patent: Oct. 12, 2004

(54) MOTOR CONTROLLER (75) Inventor: David Messersmith, Kenosha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 79 days.

(21) Appl. No.: 10/244,649

(22) Filed: Sep. 16, 2002

(65) Prior Publication Data
US 2004/0051494 A1 Mar. 18, 2004

(51) Int. Cl.$^7$ .............................. H02P 5/28; H02P 7/36
(52) U.S. Cl. ...................... 318/729; 318/798; 318/809
(58) Field of Search .................................. 318/729, 798, 318/809, 800, 438, 799, 801, 811; 388/928.1

(56) References Cited

U.S. PATENT DOCUMENTS

| 4,767,975 A | 8/1988 | Unsworth |
| 4,912,390 A | 3/1990 | Curran, Jr. et al. |
| 4,996,469 A | 2/1991 | DeLange et al. |
| 5,008,608 A * | 4/1991 | Unsworth et al. .......... 318/729 |
| 5,410,240 A | 4/1995 | Runggaldier et al. |
| 5,565,753 A * | 10/1996 | Chen et al. .................. 318/809 |
| 6,407,529 B1 * | 6/2002 | Gritter et al. ............... 318/778 |

* cited by examiner

Primary Examiner—Bentsu Ro
Assistant Examiner—Patrick Miller
(74) Attorney, Agent, or Firm—Quarles & Brady LLP; Alexander M. Gerasimow (57) ABSTRACT A method and apparatus for operating a motor controller to cause balanced positive and negative current half-cycles in a motor phase, the method comprising the steps of, for an occurring half-cycle, identifying the most recently obtained valid shut-off angle, identifying the fire angle immediately preceding the identified shut-off angle, mathematically combining the identified fire angle and the identified shut-off angle to identify a next virtual zero crossing (VZC) angle, mathematically combining the next VZC angle and the notch angle to determine a fire angle for the occurring half-cycle and repeating the method for the next half-cycle.

29 Claims, 4 Drawing Sheets

MOTOR CONTROLLER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is motor controllers and more specifically control algorithms for use with thyristor based controllers for balancing the positive and negative current half-cycles within a motor phase.

One type of commonly designed induction motor is a three phase motor having three Y-connected stator windings. In this type of motor, each stator winding is connected to an AC voltage source by a separate supply line, the source generating currents therein. Most utilities which supply power to industrial motors supply well balanced purely sinusoidal three phase voltages (and corresponding currents) that have equal amplitudes and periods and are out of phase by exactly 120°. Nevertheless, for various reasons, switching assemblies and corresponding controllers have been developed to alter the sinusoidal current and voltage waveforms at the point of utilization.

For example, one common three phase switching assembly includes three solid state switching devices, one device for each separate system phase. Each device is positioned in series between the source and the motor phase and can generally be used to control the current passed from the corresponding supply line to the corresponding motor phase. An exemplary switching device may include a pair of separately controllable silicon controlled rectifiers (SCRs) linked together in an inverse parallel relationship so that each SCR is arranged to conduct current in a direction opposite that of the other. Inverse parallel SCRs are commonly referred to as thyristors.

As well known in the art, an SCR does not conduct until after the SCR is triggered (i.e., turned on) and voltage there across is of a polarity that is consistent with the direction in which the SCR conducts. When voltage across an SCR is consistent with the direction in which the SCR conducts, once triggered, the SCR remains in a conductive state until current through the SCR drops to a zero value at which point the SCR turns off. Because the voltage across the SCR is sinusoidal and the current through the SCR is related to (i.e., lags behind) the voltage across the SCR, the SCR turns off within one-half of a line voltage cycle.

According to at least one control scheme, thyristor SCRs are alternately fired to provide alternating positive and negative current half-cycles to a corresponding motor phase. Each pair of consecutive alternating current half-cycles are separated by a "notch" period corresponding to the turn off or shutoff angle of a first SCR in the pair and the turn on or fire angle of the second SCR in the pair. For instance, after a first positive current conducting SCR is fired while the voltage there across is positive, the first SCR remains conducting and current magnitude therethrough rises until the voltage across the SCR reaches a zero value. When the voltage across the first SCR becomes negative, the current magnitude through the first SCR begins to decrease. Eventually, the current through the first SCR drops to a zero value at a first SCR turn off or shutoff angle and the notch period begins.

At the end of the notch period and during the negative half-cycle of the line voltage, the second SCR in the pair is fired, the second SCR begins to conduct and the current magnitude through the second SCR rises until the line voltage again reaches a zero value. When the voltage across the second SCR becomes negative, the current magnitude through the second SCR begins to decrease and eventually drops to a zero value at a second SCR turn off or shutoff angle and a second notch period begins. At the end of the second notch period and during the next positive half-cycle of the line voltage, the first SCR in the pair is again fired, the first SCR begins to conduct and the current magnitude through the first SCR rises until the line voltage again reaches a zero value and the process above is repeated.

Other control schemes call for skipping line voltage cycles to alter motor speed. For instance, according to one scheme, the first SCR in each thyristor is fired during a first line voltage cycle, no SCR is fired during a second voltage cycle, the second SCR in each thyristor is fired during a third line voltage cycle, no SCR is fired during a fourth voltage cycle, the first SCR is again be fired during a fifth line voltage cycle and the pattern is repeated in a continuous fashion. Thus, by controlling the notch periods and, more specifically, the fire times of thyristor SCRs, currents provided to motor phases are controllable.

During a motor starting protocol, after an equipment operator applies a starting signal to the motor controller, the motor controller gradually increases the amount of current applied to the motor by regulating the SCR fire angles. By regulating the fire angles, the controller turns on each thyristor initially for only a portion of each half-cycle of the line voltage for the corresponding motor phase (i.e., the notch periods comprise relatively long portions of each voltage half-cycle). The controller then gradually increases the half-cycle on time of the thyristors (i.e., reduces notch periods), thus gradually increasing stator currents, until the motor is at substantially full speed. This technique reduces the current consumption and torque on the motor during start-up as compared to a hard switching of the full supply line voltage across the motor.

Thus, in thyristor based control systems like the one described above, motor control is premised on a simple algorithm for notch control and more specifically, a simple algorithm for identifying SCR fire times. In essence, according to the simplest fire angle algorithms, the fire angle for one SCR in a thyristor is calculated by adding a desired notch period to a most recent shutoff angle corresponding to the other SCR in the thyristor.

When a simple fire angle algorithm like the one described above is employed, the relationship between the shutoff angle of one SCR in a thyristor pair and fire angle of the other SCR in the pair is wholly a function of the algorithm and does not account for actual motor operating conditions (i.e., fire angle=shutoff angle plus notch period). However, the SCR shutoff angles are directly related to motor operating conditions and are also related to the fire angles at which the SCR is triggered. For instance, all other things being equal, if a fire angle is delayed by 10 degrees the corresponding shutoff angle for the SCR will be expedited by approximately 10 degrees (at least during steady state operation). As another instance, if the power factor PF angle (i.e., the angle corresponding to the delay between the line voltage and the line current) is altered, then the duration between a fire angle and a shutoff angle is also altered. Other changes to the operating conditions that affect shutoff angles are contemplated.

Despite its intuitive form, unfortunately the simple fire angle algorithm described above operates ineffectively under certain circumstances. To this end, there are conditions in which the simple fire angle algorithm causes a system to become "undesirably stable". Here, the phrase "undesirably stable" is used to refer to conditions wherein the system is stable despite unbalanced positive and negative current half-cycles within each motor phase (e.g., a phase current may include positive half-cycles having a greater magnitude than negative half-cycles or vice versa). For instance, referring to FIG. 1, a full cycle of exemplary undesirably stable phase voltage and current waveforms 150 and 152 are illustrated where the notch period is 50 degrees. A first shutoff angle occurs at 50 degrees and thus at 100 degrees (i.e., after a 50 degree notch) a first fire angle occurs and current is conducted through a corresponding SCR. The SCR continues to conduct until current therethrough reaches a zero value at shutoff angle 240 degrees which is 60 degrees after the most recent voltage zero crossing at angle 180 degrees. At this point, according to the simple fire time algorithm, the next fire time is calculated to be 290 degrees (i.e., shutoff angle 240 degrees plus the 50 degree notch) and the next shutoff time is 410 degrees which is 50 degrees into the next cycle. Thus, in the illustrated example, the positive half-cycles each have a larger firing duration (i.e., the duration between a fire angle and a shutoff angle) than the negative half-cycles and hence the positive current magnitude is greater than the negative current magnitude despite the fact that the notch widths are the same.

Figure 1:
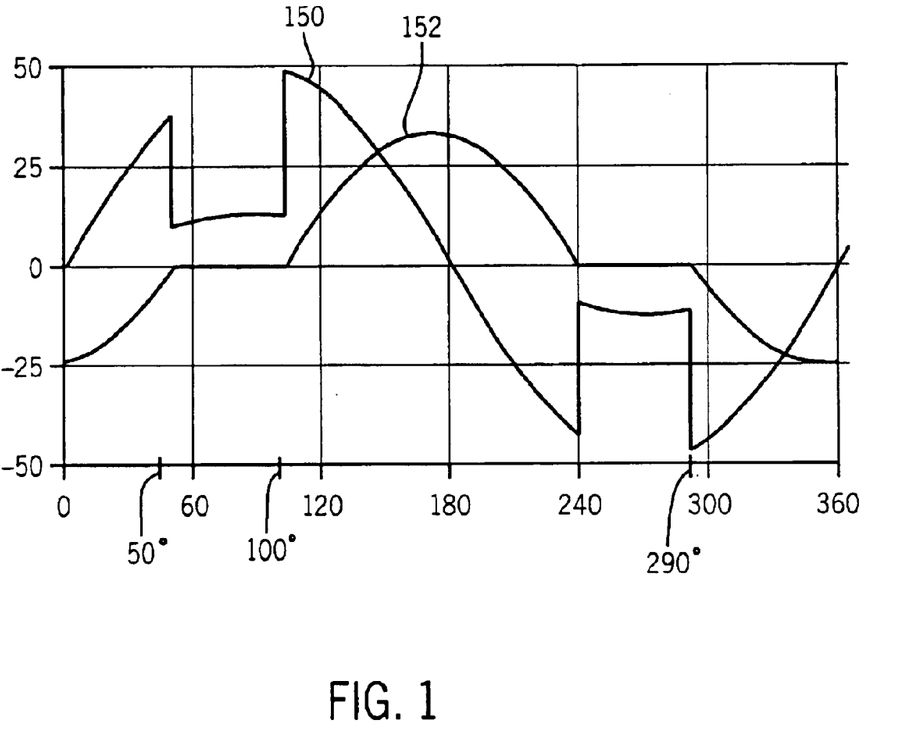
FIG. 1 is a graph illustrating exemplary unbalanced positive and negative half-cycle voltage and current waveforms that occur as a function of a specific set of control operating circumstances.

One way to understand this phenomenon is to consider what happens when the first notch illustrated in FIG. 1 is shifted. For instance, assume that the first notch in FIG. 1 (i.e., the notch between 50 and 100 degrees) is shifted to the left 10 degrees while keeping the notch width (e.g., 50 degrees) constant. In this case, the shift first fire angle begins at 40 degrees (i.e., 10 degrees earlier than illustrated) and the notch on the right is shifted further to the right. The end result is that the firing duration beginning at the 90° angle (i.e., shutoff angle 40° plus the 50° notch) becomes wider while the subsequent firing duration that begins at the end of the second width becomes shorter.

The imbalance illustrated in FIG. 1 can be caused by at least two sets of operating circumstances that are relatively common during motor operation. First, shutoff detection errors can result in imbalance. For instance, where a shutoff angle is erroneously detected to have occurred 5 degrees after an actual shutoff angle, the following fire time will be off by 5 degrees. Second, changes in notch size can result in imbalance. Both shutoff angle detection errors and notch size changes are common in thyristor based control schemes and therefore the problem associated with undesirably stable systems must be resolved.

One solution to the imbalance problem has been to add a damping term to the simple fire angle algorithm according to the following equation:

$$F_c = SO_p + D_t + NW \qquad \text{Eq. 1}$$

Where $F_c$ is the next firing angle, $SO_p$ is the previous shut-off angle, $D_t$ is the damping term and $NW$ is the desired notch width. Damping term $D_t$, in at least one case, has been calculated as a function of the difference between consecutive "lag" periods where a lag period corresponds to the duration between a shutoff angle and a previous voltage zero crossing. For instance, in FIG. 1, a first lag value would be 50 degrees (i.e., shutoff angle 50 degrees less the zero crossing at 0 degrees) and a second lag value would be 60 degrees (i.e., shutoff angle 240 degrees less zero crossing at 180°). The damping term $D_t$ for a specific fire angle $F_c$ is calculated as the difference between the two subsequent lags multiplied by a gain term $k_d$ according to the following equation:

$$D_t = (\text{Lag1} - \text{Lag2}) * k_d \qquad \text{Eq. 2}$$

This modification to the simple fire angle algorithm moves the shutoff angles toward the same positions in each half-cycle thereby tending to balance the positive and negative half-cycles. Unfortunately, control systems that include a damping gain $k_d$ requires a settling time in order to achieve a steady state operating condition. The settling time results in a restriction on how fast the notch width can be changed and, because the notch size is a primary control variable in thyristor based control schemes, this restriction undesirably affects overall system response.

Thus, it would be advantageous to have a system that employs a fire angle algorithm that is related to actual operating characteristics of the system and that quickly and accurately identifies fire angles to balance positive and negative half-cycle currents.

BRIEF SUMMARY OF THE INVENTION

It has been recognized that instead of tying fire angles solely to shutoff angles, fire angles can be related to recent system operating characteristics. In this way fire angles are selected as a function of actual motor operating characteristics and thus, changes in system operation are reflected in the fire angles and positive and negative half-cycle balance is attained in a simple, quick and inexpensive manner. More specifically, instead of adding a desired notch duration to a shutoff angle to identify a next fire angle as in the prior art, the present invention identifies an expected peak current angle (referred to herein as a next virtual zero crossing (VZC) angle) for a voltage half-cycle and subtracts a fraction of an ideal firing period therefrom to identify the fire angle for the half-cycle. A peak current magnitude occurs generally at a half way point between a fire angle and a following shutoff angle. The ideal firing period is the period between a fire angle and a consecutive shutoff angle. Thus, where one-half of the ideal firing period is subtracted from a peak current angle, the resulting angle is an optimal fire angle for a cycle. Hence, where the next peak current angle can be identified prior to a fire angle occurring, one-half the firing period can be subtracted from the next peak current angle to identify the optimal next fire angle.

The VZC angle (e.g., peak current angle) for a cycle can be determined in one of two ways. First, where a valid shutoff angle is obtained during a half-cycle (i.e., during an "occurring" half-cycle), the shutoff angle and the preceding fire angle can be combined to identify a next VZC angle. For instance, in one embodiment a preceding VZC angle that occurs during a half-cycle immediately preceding the occurring half-cycle can be identified by adding one half the difference between the most recent shutoff angle and the preceding fire angle to the preceding fire angle. Thereafter, 180 degrees is added to the preceding VZC angle to provide the next VZC angle.

Second, where a valid shutoff angle has not been obtained during the occurring half-cycle (i.e., within an expected window), the most recently acquired valid shutoff angle and immediately preceding fire angle can be combined to identify a VZC angle for a previous voltage half-cycle and the difference between the VZC angle for the previous voltage half-cycle and the actual voltage zero crossing angle for the previous voltage half-cycle can be stored to be subsequently used as an estimate of the difference between an actual (e.g., sensed) voltage zero crossing angle and corresponding next VZC angle during the current half-cycle. Here, the difference between a VZC angel and an associated voltage zero crossing angle corresponding to a previous valid shutoff angle is referred to as a zero crossing delta (ZCΔ) value. After the ZCΔ is stored, when a shutoff angle does not occur or is not sensed for some reason during an expected time range, the ZCΔ can be added to a sensed voltage zero crossing angle to estimate the next sensed voltage zero crossing angle to estimate the next VZC which is then used to identify the next firing angle.

Thus, it should be appreciated that each of the two methods described above employ data that directly reflects how the motor is instantaneously operating to determine the next fire angle and therefore that the resulting fire angles are selected so that the positive and negative half-cycles are essentially balanced.

Consistent with the above teachings, the invention includes a method for operating a motor controller to cause balanced positive and negative current half-cycles in a motor phase, the motor controller utilizing switching devices to periodically connect a motor phase stator winding to a current source supply line in which each switching device enters a non-conductive state during a notch period of each alternating current half-cycle, each notch period beginning at a shut-off angle when current through the respective switching device becomes zero and ending at a fire angle when the respective switching device is again placed in a conductive state, the controller identifying a desired fire angle, the method comprising the steps of, for an occurring half-cycle, identify a next virtual zero crossing (VZC) angle corresponding to an angle estimate during the current half-cycle at which the magnitude of the fundamental component of the current will begin to decrease, mathematically combining the next VZC angle and the desired notch period to identify the fire angle for the occurring half-cycle and repeating the method for the next half-cycle as the occurring half-cycle.

In at least one embodiment the step of identifying a VZC angle includes the steps of identifying a shut-off angle during the occurring half-cycle and a fire angle preceding the identified shutoff angle and mathematically combining the identified shutoff angle and the identified fire angle. In a more specific embodiment the step of mathematically combining the identified fire angle and the identified shutoff angle includes identifying a fraction of the difference between the identified fire angle and the identified shut-off angle as a most recent firing period fraction and adding the most recent firing period fraction to the identified fire angle to identify a previous VZC angle where the previous VZC angle corresponds to the angle during the previous half-cycle at which the magnitude of the fundamental component of the current began to decrease. In an even more specific embodiment the step of identifying a fraction includes dividing the difference between the identified shut-off angle and the identified fire angle by 2.

In at least one embodiment the step of mathematically combining to determine the next VZC angle further includes adding 180 degrees to the previous VZC angle. In a more specific embodiment the step of determine the next fire angle further includes subtracting the notch period from 180 degrees to identify a firing period, identifying a fraction of the firing period and mathematically combining the firing period fraction next VZC angle to identify the next fire angle. In a further embodiment the step of identifying a fraction includes dividing the firing period by 2.

In one embodiment the step of identifying a fraction includes receiving a notch control value between 0 and 1 and multiplying the firing period by the notch control value. Here, the step of identifying a most recent firing period fraction may include multiplying the difference between the identified fire angle and the identified shut-off angle by the notch control value.

One embodiment further includes the steps of, prior to identifying the fire angle, identifying a shut-off angle window during the occurring half-cycle during which a shut-off angle is expected to occur and determining if a shut-off angle occurs in the angle window, if a shut-off angle occurs in the angle window, performing the process above, else, performing an alternative process to determine the next fire angle.

The step of performing an alternative process may include the steps of identifying the most recent voltage zero crossing angle, identifying a ZCΔ value and mathematically combining the most recent voltage zero crossing angle, the ZCΔ value and the notch period to determine the next fire angle.

In one embodiment the step of identifying a ZCΔ value includes the step of identifying the most recently obtained valid shutoff angle as a valid shutoff angle, the fire angle immediately preceding the valid shutoff angle as a valid fire angle and the voltage zero crossing angle immediately preceding the valid fire angle as a valid voltage zero crossing angle, combining the valid shutoff angle and the fire angle to identify a VZC angle estimate for a corresponding half-cycle, and identifying the difference between the estimated VZC angle and the valid voltage zero crossing angle as the ZCΔ value. More specifically, the step of combining the valid shutoff angle and the valid fire angle may include dividing the sum of the valid shutoff angle and the valid fire angle by 2 to identify the VZC angle.

The invention also includes a method for operating a motor controller to cause balanced positive and negative current half-cycles in a motor phase, the motor controller utilizing switching devices to periodically connect a motor phase stator winding to a current source supply line in which each switching device enters a non-conductive state during a notch period of each alternating current half-cycle, each notch period beginning at a shut-off angle when current through the respective switching device becomes zero and ending at a fire angle when the respective switching device is again placed in a conductive state, the controller providing a desired notch period, the method comprising the steps of, for an occurring half-cycle, identifying the most recently obtained valid shut-off angle, identifying the fire angle immediately preceding the identified shut-off angle, mathematically combining the identified fire angle and the identified shut-off angle to identify a next virtual zero crossing (VZC) angle, mathematically combining the next VZC angle and the notch angle to determine a fire angle for the current half-cycle and repeating the method for the next half-cycle as the occurring half-cycle.

In a more specific embodiment the step of mathematically combining to determine the next VZC angle includes performing a first process when the most recently occurring shut-off angle occurs in the occurring half-cycle and includes performing a second process when the most recently occurring shut-off angle occurs in other than the occurring half-cycle. Here, the step of performing the first process may include adding the identified fire angle to a fraction of the difference between the identified fire angle and the identified shut-off angle to provide a preceding VZC angle corresponding to the half-cycle immediately preceding the occurring half-cycle and adding 180 degrees to the preceding VZC angle to identify a next VZC angle. Also, the step of performing the second process may include identifying a most recent voltage zero crossing angle immediately preceding the current half-cycle, identifying a ZCΔ value corresponding to the most recently obtained valid shutoff angle, the fire angle immediately preceding the most recently obtained shutoff angle and the voltage zero crossing angle immediately preceding the fire angle and adding the ZCΔ value to the current voltage zero crossing angle.

The step of mathematically combining to determine the next fire angle may include subtracting the notch period from 180 degrees to provide a firing period and subtracting a fraction of the firing period from the next VZC angle.

The invention also includes an apparatus for operating a motor controller to cause balanced positive and negative current half-cycles in a motor phase, the motor controller utilizing switching devices to periodically connect a motor phase stator winding to a current source supply line in which each switching device enters a non-conductive state during a notch period of each alternating current half-cycle, each notch period beginning at a shut-off angle when current through the respective switching device becomes zero and ending at a fire angle when the respective switching device is again placed in a conductive state, the controller providing a desired notch period, the apparatus comprising a processor running a pulse sequencing program to perform the steps of, for an occurring half-cycle, identifying the most recently obtained valid shut-off angle, identifying the fire angle immediately preceding the identified shut-off angle, mathematically combining the identified fire angle and the identified shut-off angle to identify a next VZC angle, mathematically combining the next VZC angle and the notch angle to determine a next fire angle for the occurring half-cycle and repeating the steps above for the next occurring half-cycle.

In a more specific embodiment the program causes the processor to perform the step of mathematically combining to determine the VZC angle by performing a first process when the most recently occurring shut-off angle occurs in the occurring half-cycle and includes performing a second process when the most recently occurring shut-off angle occurs in other than the occurring half-cycle. In an even more specific embodiment the program causes the processor to perform the first process by adding the identified fire angle to a fraction of the difference between the identified fire angle and the identified shut-off angle to provide a preceding VZC angle that occurs during a preceding half-cycle and adding 180 degrees to the preceding VZC angle to provide the next VZC angle.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

While the present invention may be embodied in any of several different forms, the present invention is described here with the understanding that the description sets forth an exemplary embodiment of the present invention which is not intended to limit the scope of the invention—the claims at the end of this description should be referred to for a complete understanding of the breadth of the inventive concepts.

A. Hardware

The present invention will be described in the context of the exemplary motor system 10 shown in FIG. 2. A three phase power source provides three phase alternating voltage on supply lines 5, 6 and 7 to a thyristor switch module 36 and therethrough to lines 14, 16 and 18, respectively, which are in turn linked to a three phase induction motor 12. Induction motor 12 has three stator windings 20, 22, 24 which are coupled in a Y configuration at neutral node 26. The distal ends of stator windings 20, 22, 24 are connected at motor terminals 28, 30, 32 to lines 14, 16 and 18, respectively. The phase of the voltage on line 5 leads the phase of the voltage on supply line 6 which in turn leads the phase voltage on supply line 7.

A control system that includes switch module 36 also includes a control module 34, first, second and third current sensors (e.g., Hall effect sensors) 58, 60 and 61 and three voltage sensors 55, 57 and 59. Current sensors 58, 60 and 61 are linked to lines 14, 16 and 18, respectively, to sense current passing therethrough and provide current level signals to control module 34. Similarly, voltage sensors 55, 57 and 59 are linked to lines 5, 6 and 7 respectively, for sensing voltages on each of the corresponding lines and to provide the sensed signals to module 34. Control module 34 uses the current signals and voltage signals supplied by sensors 58, 60 and 61 and 55, 57 and 59 to determine how to control thyristor switch module 36 to supply desired currents on lines 14, 16 and 18. To control switch module 36, control module 34 is linked to switch module 36 via three separate control lines 46, 48 and 50 and provides fire pulses on lines 46, 48 and 50 at fire angles that are determined according to an inventive control algorithm described below.

Figure 2:
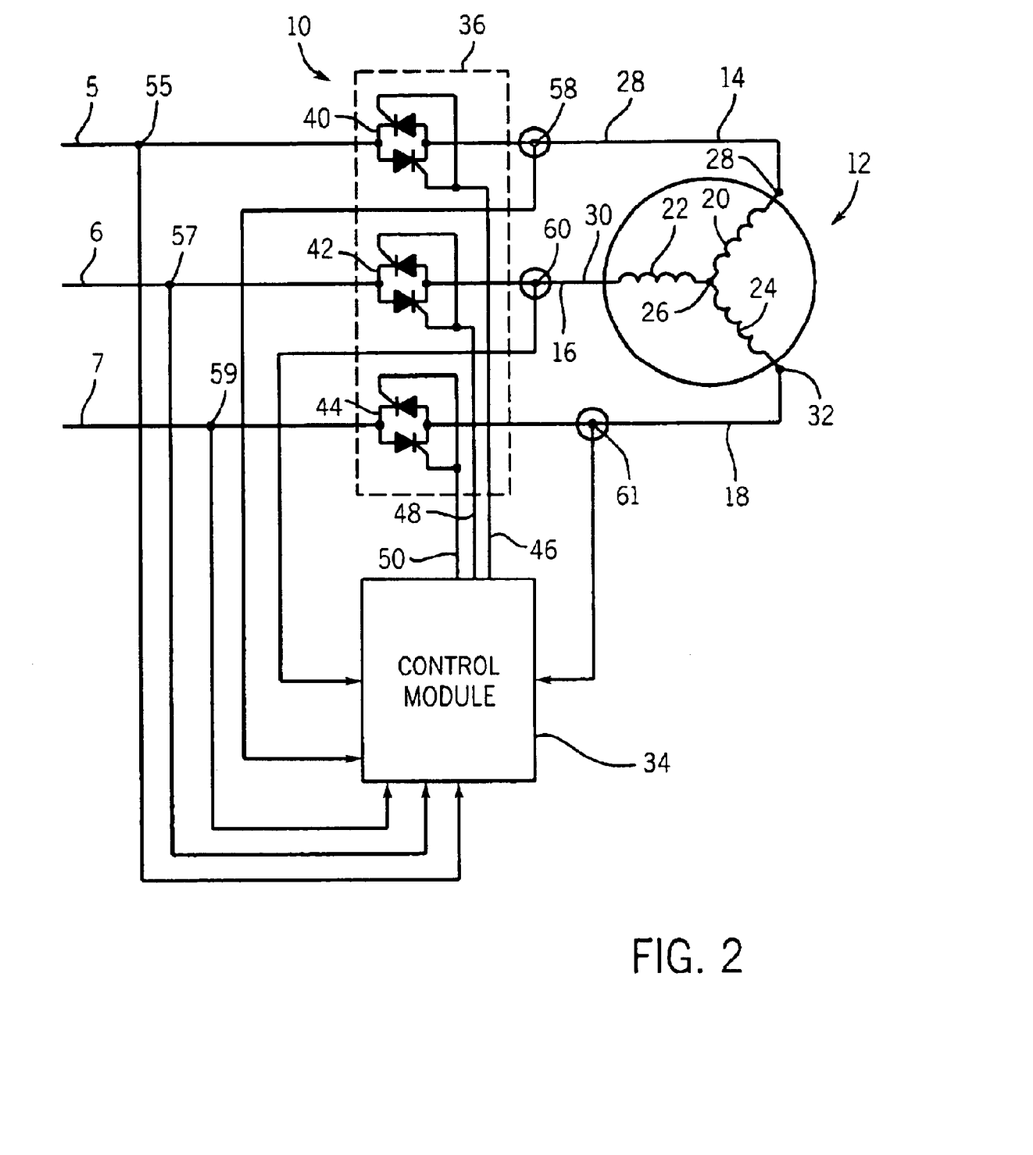
FIG. 2 is a schematic diagram illustrating an exemplary motor control system used to implement the present invention.

Referring still to FIG. 2, switch module 36 includes three separate thyristor switches 40, 42 and 44. Each thyristor switch 40, 42, 44 consists of a pair of inversely connected silicon controlled rectifiers (SCR's). Switches 40, 42 and 44 are linked in series between the supply lines 5, 6 and 7 and lines 14, 16 and 18 (i.e., motor terminals 28, 30 and 32), respectively. For instance, switch 40 is linked between supply line 5 and line 14. Similarly, switch 42 is linked between supply line 6 and line 16 while switch 44 is linked between supply line 7 and winding 18. Each thyristor switch 40, 42, 44 controls the voltage at, and current through, an associated motor terminal 28, 30 or 32 and, to that end, switches 40, 42 and 44 are linked to control module 34 via control lines 46, 48 and 50, respectively, to receive fire signals.

Operation of each of switches 40, 42 and 44 and corresponding control lines, supply lines, etc., is essentially identical and therefore, in the interest of simplifying this explanation, unless indicated otherwise, only switch 40 and control thereof will be explained here in detail. It should be understood, however, that all discussion regarding switch 40 and operation thereof is applicable to operation of each of switches 42 and 44 and that control module 34 controls each of switches 40, 42 and 44 simultaneously.

As well known in the controls art, an SCR conducts in a single direction, only turns on when properly biased and when fired (i.e., when a fire signal is received) and turns off when current therethrough drops to a zero level. For example, referring to FIG. 2, when a positive voltage is provided on line 5 and a fire signal is provided to switch 40 via line 46, the lower SCR in switch 40 turns on and conducts thereby providing current to line 14. If the supply voltage on line 5 is sinusoidal, eventually the current through the lower SCR in switch 40 drops to a zero value and the lower SCR in switch 40 turns off. The upper SCR in switch 40 operates in a similar fashion (i.e., the upper SCR can be turned on during negative half-cycles of a sinusoidal voltage on line 5 via a fire signal and will eventually turn off when the current therethrough drops to a zero value).

Figure 3A:
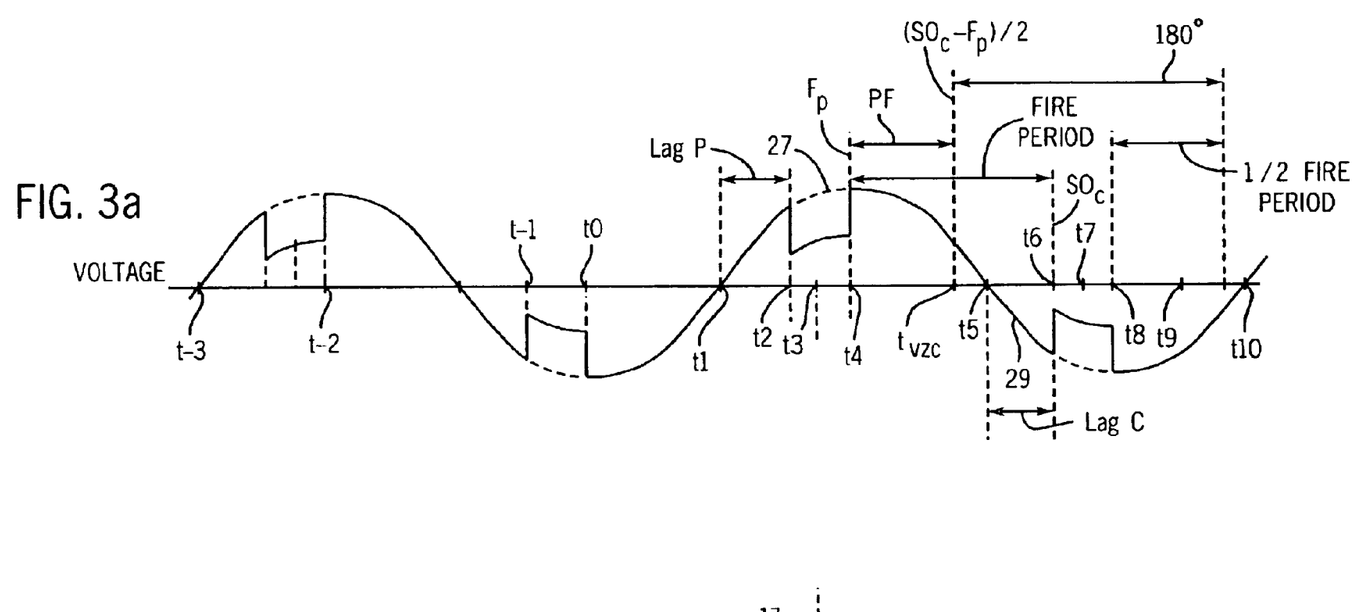
FIG. 3a is a graph illustrating a sinusoidal supply line voltage and corresponding notched voltage provided to a motor terminal and FIG. 3b is a graph illustrating a current corresponding to the notched voltage form of FIG. 3a and an associated fundamental current component.
Figure 3B:
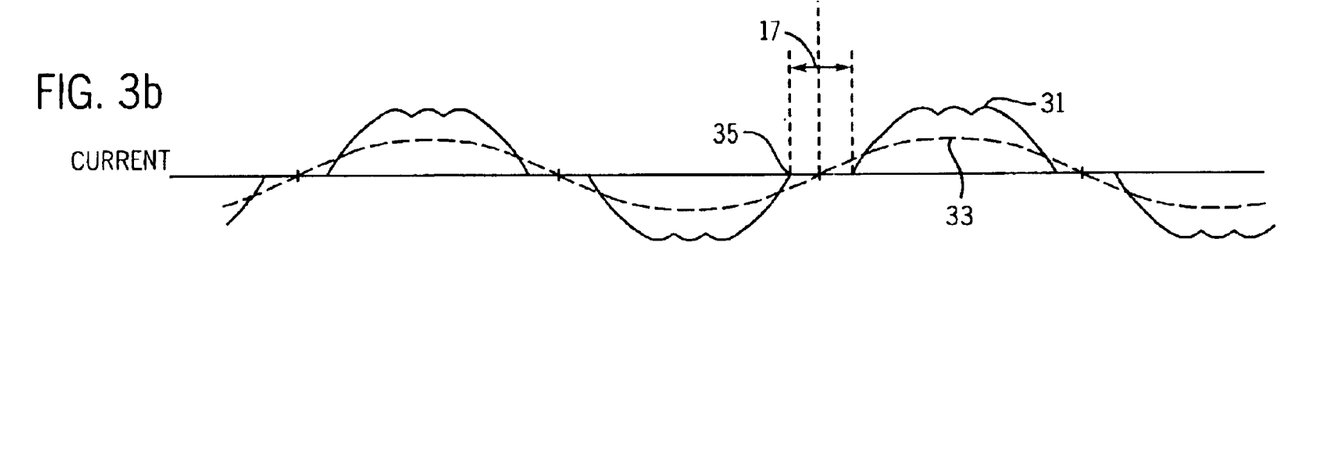

Referring to FIGS. 3a and 3b, an exemplary voltage waveform 27 corresponding to supply line 5 and voltage and current waveforms 29 and 31, respectively, on line 14 are illustrated, where current waveform 31 has a fundamental component 33. Supply line voltage 27 is purely sinusoidal and, if thyristor switch 40 where controlled to conduct at all times, the voltage at line 14 would likewise be completely sinusoidal.

To control the current provided on line 14 to winding 20, control module 34 is used to introduce non-conducting periods into each half-cycle of the voltage provided on line 14 by selecting the fire times of the SCRs that comprise switch 40. Thus, for instance, in FIG. 3a, assume that the upper SCR in switch 40 (see also FIG. 2) is on at time t1. In this case the voltage at line 14 will be equal to the voltage at line 5 and hence will track the sinusoidal waveform 27 illustrated in FIG. 3a. In addition, the upper SCR in switch 14 will conduct exemplary current 31 illustrated in FIG. 3b at time t1. Eventually, at time t2, the current through the upper SCR in switch 40 drops to a zero value and the upper SCR shuts off so that the voltage at line 14 drops to a back EMF voltage level associated with operation of motor 12. The line 14 voltage continues to track the back EMF voltage 29 until one of the upper or lower SCRs in switch 40 is fired to conduct.

At time t4 another fire pulse or signal is provided via line 46 to switch 40. Because a positive voltage is provided on line 5 at time t4, the lower SCR in switch 40 is biased on and the t4 fire pulse causes the lower SCR in switch 40 to conduct. The voltage 29 at line 14 again tracks the voltage 27 at supply line 5 and current 31 is again passed to line 14 and hence to winding 20. Because the line voltage 27 is sinusoidal, eventually, at time t6, the current through the lower SCR in switch 40 drops to a zero value and the lower SCR turns off.

Between time t2 when the upper SCR in switch 40 shuts off and time t4 when the lower SCR in switch 40 is fired, a notch 17 is provided in the line 14 voltage which causes the voltage waveform 29 to occur at line 14. The resulting current provided on line 14 to motor 12 is directly related to the size or duration of notch 17. Thus, for instance, where notch 17 is relatively large, the current on line 14 will be relatively small and where notch 17 is relatively small, the current on line 14 will be relatively large. Control module 34 is used to control the duration y of notch 17 and hence to control the current provided on line 14.

B. Theory

Previous algorithms for determining SCR fire angles generally did not account for operating nuances that occur during motor control and operation. The present inventive algorithm accounts for motor operating nuances by determining fire angles at least in part as a function of previous SCR shutoff times which are directly related to actual and essentially instantaneous motor operation characteristics.

Prior to discussing the theory behind the inventive algorithm, it is helpful to adopt specific labels in the interest of clarity. To this end, referring again to FIGS. 3a and 3b, assume a time t7. Here, the phrase "occurring half-cycle" is used to refer to the voltage half-cycle that is presently occurring and, with respect to time t7, the occurring half-cycle occurs between times t5 and t10. The phrase "preceding half-cycle" is used to refer to the voltage half-cycle that immediately precedes the occurring half-cycle and at time t7, the preceding half-cycle occurs between times t1 and t5 (i.e., the half-cycle preceding current half-cycle t5–t10). The phrase "virtual zero crossing (VZC) angle" is used to refer to the angle that is midway between a fire angle and a following shutoff angle. An exemplary VZC angle is identified at time $t_{VZC}$ in FIG. 3a which is the midpoint between the shutoff angle at time t4 and the fire angle at time t6.

It has been recognized that a most recent VZC angle can be used to incorporate both the most recent shutoff angle and a corresponding most recent fire angle and hence the instantaneous and actual motor operating characteristics into a determination of a next fire angle thereby resulting in an accurate fire angle selection. More specifically, to determine the fire angle for an occurring half-cycle, the fire angle from the previous half-cycle and the shutoff angle from the occurring half-cycle can be combined to identify a preceding VZC angle by solving the following equation:

$$VZC = F_p + (SO_c - F_p)/2 \qquad \text{Eq. 3}$$

where $F_p$ is the fire angle from the previous half-cycle and $SO_c$ is the shutoff angle corresponding to the occurring half-cycle. Thereafter, the midpoint of the next current cycle, also referred to as the next VZC angle, is estimated by adding 180° to the preceding VZC. The appropriate firing angle for the occurring half-cycle can then be determined by subtracting half of a desired firing period from the estimated midpoint angle (e.g., from the estimated next virtual zero crossing angle). The desired firing period is equal to 180 degrees minus the desired notch angle size or duration. For instance, if a desired notch duration is 50 degrees, the firing period would be 130 degrees. An equation for the next fire angle $F_n$ that includes all of the calculations above can be written as:

$$F_n = VZC + 180° - \text{Firing Period}/2 \qquad \text{Eq. 4}$$

Taking a closer look at Equation 3, it should be appreciated that the VZC angle at time $t_{VZC}$ is actually the peak of the current waveform 31 and is generally the point at which the fundamental current component 33 stops rising and starts decreasing in magnitude. This VZC angle, when referenced to the peak of the voltage waveform 27, is the power factor angle for the system. As well known, the power factor angle does not change quickly from cycle to cycle and therefore, it can be expected that consecutive VZC angles will be essentially 180° apart. The only time consecutive VZCs deviate from 180° separation is when the PF angle is changing in which case the cycle to cycle change is still very minimal resulting in, in the worst case, consecutive VZC angles being very close (e.g., ±2°) to 180° apart.

Importantly, the Equation 3–4 algorithm is not affected by the same instability problem that occurs in the case of previous notch control algorithms. To this end, with previous notch algorithms, only second shutoff angles were used to identify fire angles. Where only a shutoff angle is used to calculate a next fire angle, when a shutoff angle is shifted for some reason, the algorithm is not formulated to identify why a shift has occurred. For instance, when a most recent fire angle occurs earlier in a corresponding cycle so that the resulting shutoff angle occurred later (i.e., is delayed) the previous algorithms where not formulated to recognize that the most recent fire angle occurred earlier and instead simply reacted to the delayed shutoff angle by delaying the next fire angle thereby causing positive and negative current half-cycle imbalance.

With the Equation 3–4 algorithm above, the preceding fire and shutoff angles are used together to identify the next fire angle and therefore, when the preceding fire angle is early resulting in a delayed shutoff angle, the early fire angle is reflected in the next fire angle thereby resulting in a more accurate next fire angle and hence essentially balanced positive and negative current half-cycles.

A more generalized version of the Equation 3–4 algorithm is not fixed at one-half of the firing periods and is represented by the following equation:

$$F_n = (F_p + (SO_c - F_p)(K) + 180° - (\text{Firing Period})(k) \quad \text{Eq. 5}$$

where factor k is between a zero value and one. The case where k=1 is simply notch control without a damping term. The case where k is zero is not very useful as the system would simply fire every 180° with no feedback being provided by the SCR shutoff angle.

Next, performance of the inventive notch algorithm is compared to performance of previous algorithms. The previous basic notch algorithm without damping can be expressed as:

$$F_n = (SO_c + \text{Error}) + \gamma \quad \text{Eq. 6}$$

where γ is the controlled notch width. Here, clearly the entire shutoff error (i.e., Error) is reflected in the subsequent fire angle. For instance, if the shutoff angle detected is 5° later than the shutoff angle that actually occurred the next fire angle will be 5° later than it should have been.

An exemplary basic notch plus damping algorithm can be expressed as:

$$F_n = SO_c + D_f + \gamma \quad \text{Eq. 7}$$

where:

$$D_f = (\text{Lag}P - \text{Lag}C) * k_d \quad \text{Eq. 8}$$

and:

$$\text{Lag}N = SO_N - \text{VoltageZeroCrossing}N \quad \text{Eq. 9}$$

where $k_d$ is the damping term gain. Lags P and Lag C are illustrated in FIG. 3a. Equations 7–9 can be combined into the following equation:

$$F_n = SO_c += (\text{Lag}P - \text{Lag}C) * k_d + \gamma \quad \text{Eq. 10}$$

Referring to Equations 7–10, shutoff angle $SO_c$ appears twice (e.g., $SO_c$ appears in Equation 9 when calculating LagC). In addition, just as LagP is used to identify next fire angle $F_n$, LagC will be used to calculate the fire angle following angle $F_n$, thus causing the error in one shutoff angle to propagate into multiple firings.

When an error is included in Equation 10, Equation 10 can be rewritten as:

$$F_n = (SO_c + \text{Error}) + (\text{Lag}P - (\text{Lag}C + \text{Error})) * k_d + \gamma \quad \text{Eq. 11}$$

The resulting difference Δ between the correct next fire angle $F_n$ and the calculated next fire angle based on an errouenous shutoff angle $SO_c$ is:

$$\Delta = \text{Error} - \text{Error} * k_d \quad \text{Eq. 12}$$

Thus, damping term $k_d$ reduces the fire angle $F_n$ error but, nevertheless, as discussed above, at least some fraction of the error still propagates to multiple fire angle calculations.

Next, the inventive notch algorithm in Equation 5 can be rewritten to include a shutoff angle error as:

$$F_n = (F_p + (SO_c + \text{Error} - F_p) * k) + 180° - \text{FiringPeriod} * k \quad \text{Eq. 13}$$

Here, the difference Δ between next fire angles $F_n$ with and without the Error term can be expressed as:

$$\Delta = \text{Error} * k \quad \text{Eq. 14}$$

Thus, the error with the inventive algorithm is a function of gain or factor k. With a typical factor k of 0.5, the resulting fire angle error is half the shutoff detection error. It should also be noted that the resulting error does not propagate into subsequent fire angle calculations. Moreover, by lowering value k the affect of the error term can be reduced.

There are additional benefits to using the new algorithm. For instance, in cases where a valid shutoff angle is not detected, a modified version of Equation 5 can be used to identify a generally accurate next fire angle. To this end, another version of Equation 5 is:

$$F_n = \text{VoltageZeroCrossing}C + \left(\frac{SO_v + F_v}{2} - \text{VoltageZeroCrossing}V\right) - (\text{FiringPeriod})(K) \quad \text{Eq. 15}$$

where VoltageZeroCrossingC is the angle of the voltage zero crossing corresponding to the current half-cycle (i.e., the most recent voltage zero crossing angle), $SO_v$ is the shutoff angle corresponding to the most recently occurring valid (hence the "v" qualifier) shutoff angle, $F_v$ is the fire angle immediately preceding angle $SO_v$ and VoltageZeroCrossingV is the voltage zero crossing immediately preceding the $F_v$ angle. Here, it has been recognized that the difference between a voltage zero crossing angle and a corresponding virtual zero crossing (VZC) angle will change only slowly between temporally proximate voltage half-cycles and therefore the difference corresponding to one cycle can be used as a good and relatively accurate estimate of the difference during a proximally temporal half-cycle. To this end, the $(SO_v + F_v)/2$ term in Equation 15 corresponds to a VZC angle (e.g., a valid VZC angle) during the recent valid shutoff angle $SO_v$. By subtracting the recent valid zero crossing angle VoltageZeroCrossingV from the valid VZC angle a resulting difference value is generated that can be used to identify the estimated next VZC angle. In this regard the slowly changing difference value (e.g., $(SO_v + F_v)/2 - \text{VoltageZeroCrossing}V$) is added to the most recent voltage zero crossing value (e.g., VoltageZeroCrossingC) to estimate the next VZC angle. Next, consistent with Equation 5, once the next VZC angle is determined a fraction (e.g., k) of the firing period is subtracted from the next VZC angle to identify the next fire angle.

Another advantage of the inventive algorithm is that the algorithm can be employed even where cycle skipping is required to reduce motor speed. In a cycle skipping mode, instead of firing SCRs every half-cycle of the line voltage, cycles are skipped according to a pattern that results in a slower motor speed. In this case, previous notch control algorithms that rely on the occurrence of shutoff angels are entirely useless. In the present case the new algorithm can easily handle the cycle skipping condition by employing Equation 15 when no valid shutoff angle is obtained and employing Equation 5 when a valid shutoff angle is obtained.

In other words, the next VZC angle can be calculated using either a valid fire angle and shutoff angle (Equation 5) obtained during the current half-cycle or by using a most recent voltage zero crossing angle, valid previous VZC angle and valid previous voltage zero crossing angle. Then once the next VZC angle is known, an appropriate fire angle can be determine by combining the notch period and the next VZC angle.

C. Algorithm

Figure 4:
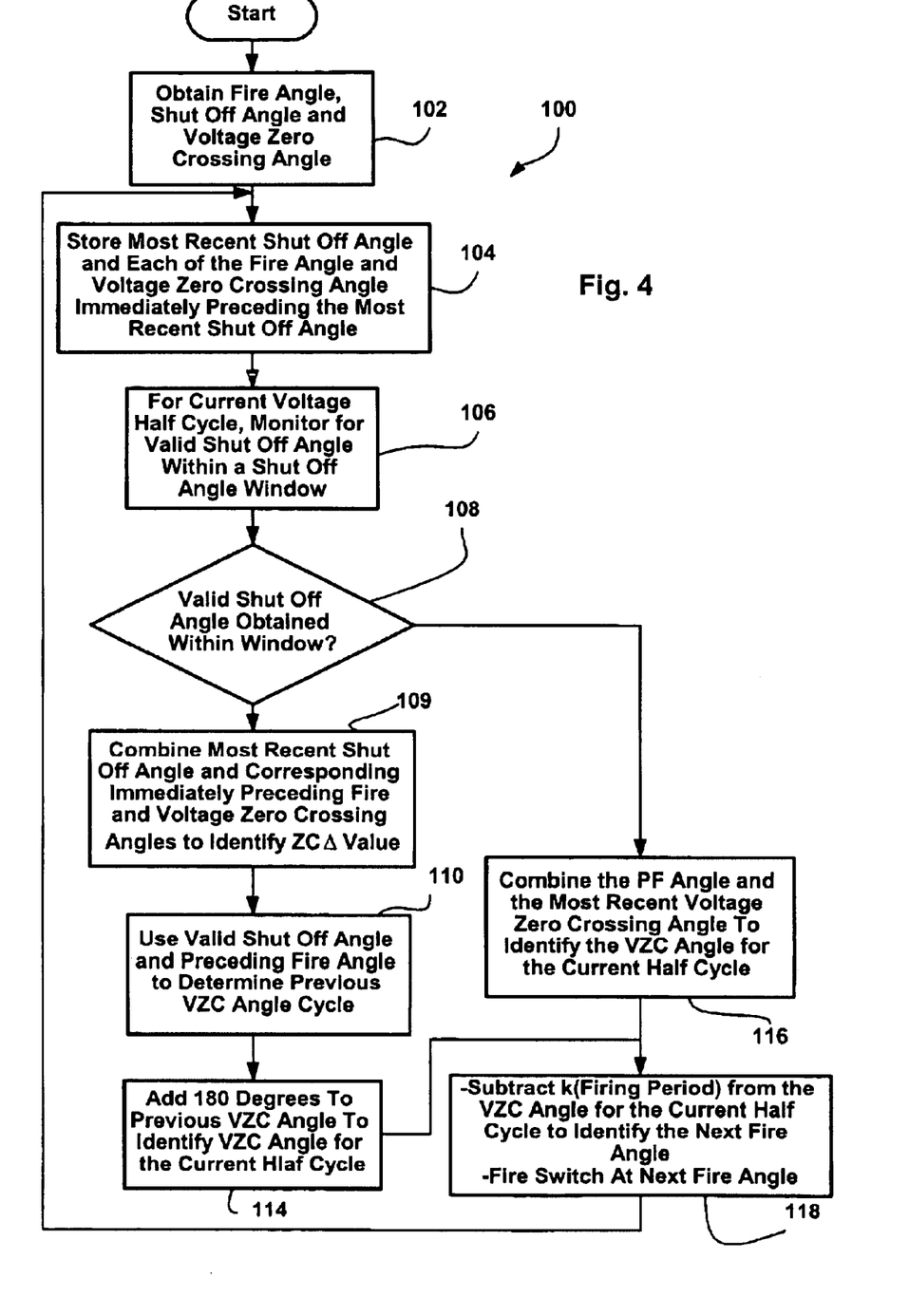
FIG. 4 is a flow chart illustrating a method according to the present invention.

Referring now to FIG. 4, an exemplary algorithm 100 according to one embodiment of the present invention is illustrated. Initially, referring to FIGS. 2 and 3a, it will be assumed that control module 34 has been controlling switch module 36 for several voltage half-cycles to provide notches in the sinusoidal voltages provided on lines 14, 16 and 18 and that the current time is t7. Thus, module 34 is operating to identify the fire angle corresponding to time t8. Moreover, it will be assumed that module 34 has been programmed to store several of the angles preceding time t7 which are required according to the present algorithm to identify time t8.

A block 102, module 34 tracks voltage zero crossing angle, fire angles and shutoff angles as they occur. At block 104, module 34 stores the most recent shutoff angle and each of the fire angle and voltage zero crossing angle that immediately precede the most recent shutoff angle. For instance, where, at time t7, the most recently acquired shutoff angle occurred at time t6, the shutoff angle corresponding to time t6 is stored along with the fire angle corresponding to time t4 and the voltage zero crossing angle corresponding to time t1. Similarly, at time t7 if the shutoff angle at time t6 was not obtained and the previous shutoff angle at time t2 was not obtained but the shutoff angle at time t-1 was obtained, the shutoff angle at time t-1 is stored along with the fire angle at time t-2 and the voltage zero crossing angle at t-3.

Referring still to FIGS. 2, 3a and 4, at block 106, module 34 attempts to obtain a shutoff angle within an expected shutoff angle window during the occurring period. For instance, where a notch duration 17 is 50°, an expected shutoff angle would be 130° after a preceding fire angle (i.e., the expected shutoff angle is one fire period after a fire angle where, consistent with the description above, a fire period is equal to 180° minus the notch period). Thus, an expected shutoff angle window corresponding to a 50° notch control scheme may be 130°±15° after the preceding fire angle (i.e., within a range of 115° to 145° after the preceding fire angle.

At block 108, where a shutoff angle occurs within the expected shutoff angle window, control passes to block 109 and therethrough to blocks 110, 114 and 118 where control module 34 performs an algorithm consistent with Equation 5 above to identify the next fire angle a time t8. More specifically, at block 109 module 34 solves the following equation:

$$ZC\Delta = \left(\frac{SO_v + F_v}{2}\right) - VoltageZeroCrossingV \qquad \text{Eq. 16}$$

to identify a zero crossing delta (ZCΔ) value for the voltage half-cycle corresponding to the valid shutoff angle and, potentially for use during subsequent voltage half-cycles when valid shutoff angles are not obtained. The ZCΔ value is the middle factor on the right hand side of Equation 15.

Next, at block 110, module 34 uses the valid shutoff angle at time t6 in FIG. 3a and the preceding fire angle at time t4 to determine the previous VZC angle at time $t_{VZC}$. At block 114, module 34 adds 180° to the angle corresponding to the time $t_{VZC}$ to identify the next VZC angle for the occurring half-cycle (i.e., the half-cycle between times t5 and t10 in FIG. 3a). Thereafter, at block 118, module 34 subtracts (k) (Firing Period) from the next VZC angle for the current half-cycle to identify the next fire angle at time t8. Module 34 fires switch 40 at fire angle t8. Control passes back up to block 104 where the process is repeated for the next half-cycle.

Referring still to FIGS. 2, 3a and 4, at block 108, where module 34 does not obtain a valid shutoff angle within the expected shutoff angle window during the occurring period, control passes to blocks 116 and 118 where module 34 performs an algorithm consistent with Equation 15 above to identify an angle corresponding to the next fire time at time t8. More specifically, at block 116, module 34 combines the zero crossing delta (ZCΔ) value from Equation 16 and figured at block 110 and the most recent voltage zero crossing angle to identify the next VZC angle for the occurring half-cycle (i.e., the half-cycle between times t5 and t10). Here, the most recent voltage zero crossing angle at time t7 corresponds to time t5 (note the difference between the most recent zero crossing angle at time t5 and the voltage zero crossing angle at time t-3 that immediately precedes the most recently obtained valid shutoff angle at time t-1). To this end, module 34 adds the ZCΔ value to the most recent voltage zero crossing angle at time t5 solving a portion of Equation 15 above. Continuing, at block 118, module 34 subtracts (k) (Firing Period) from the next VZC angle for the occurring half-cycle to identify the next fire angle at approximately time t8. Again, at block 118, module 34 fires switch 40 at the next fire angle and control passes back up to block 104.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

To apprise the public of the scope of this invention, the following claims are made:

What is claimed is:

1. A method for operating a motor controller to cause balanced positive and negative current half-cycles in a motor phase, the motor controller utilizing switching devices to periodically connect a motor phase stator winding to a current source supply line in which each switching device enters a non-conductive state during a notch period of each alternating current half-cycle, each notch period beginning at a shut-off angle when current through the respective switching device becomes zero and ending at a fire angle when the respective switching device is again placed in a conductive state, the controller identifying a desired fire angle, the method comprising the steps of:

for an occurring half-cycle:
(a) identify a next virtual zero crossing (VZC) angle corresponding to an angle estimate during the current half-cycle at which the magnitude of the fundamental component of the current will begin to decrease;
(b) mathematically combining the next VZC angle and the desired notch period to identify the fire angle for the occurring half-cycle; and
(c) repeating steps (a) and (b) for the next half-cycle as the occurring half-cycle.

2. The method of claim 1 wherein the step of identifying a next VZC angle includes the steps of identifying a shut-off angle during the occurring half-cycle and a fire angle preceding the identified shutoff angle and mathematically combining the identified shutoff angle and the identified fire angle.

3. The method of claim 2 wherein the step of mathematically combining the identified fire angle and the identified shutoff angle includes identifying a fraction of the difference between the identified fire angle and the identified shut-off angle as a most recent firing period fraction and adding the most recent firing period fraction to the identified fire angle to identify a previous VZC angle where the previous VZC angle corresponds to the angle during the previous half-cycle at which the magnitude of the fundamental component of the current began to decrease.

4. The method of claim 3 wherein the step of identifying a fraction includes dividing the difference between the identified shut-off angle and the identified fire angle by two.

5. The method of claim 3 wherein the step of mathematically combining to determine the next VZC angle further includes adding 180 degrees to the previous VZC angle.

6. The method of claim 5 wherein the step of determine the next fire angle further includes subtracting the notch period from 180 degrees to identify a firing period, identifying a fraction of the firing period and mathematically combining the firing period fraction and the next VZC angle to identify the next fire angle.

7. The method of claim 6 wherein the step of identifying a fraction includes dividing the firing period by two.

8. The method of claim 6 wherein the step of identifying a fraction includes receiving a notch control value between zero and one and multiplying the firing period by the notch control value.

9. The method of claim 8 wherein the step of identifying a most recent firing period fraction includes multiplying the difference between the identified fire angle and the identified shut-off angle by the notch control value.

10. The method of claim 1 further including the steps of, prior to identifying the fire angle, identifying a shut-off angle window during the occurring half-cycle and determining if a shut-off angle occurs in the angle window, if a shut-off angle occurs in the angle window, performing steps (a) and (b), else, performing an alternative process to determine the next fire angle.

11. The method of claim 10 wherein the step of performing an alternative process includes the steps of:
identifying the most recent voltage zero crossing angle;
identifying a zero crossing delta (ZCD) value corresponding to the difference between a preceding VZC angle and a preceding voltage zero crossing angle corresponding to the most recently identified shutoff angle; and
mathematically combining the most recent voltage zero crossing angle, the zero crossing delta value and the notch period to identify the next firing angle.

12. The method of claim 11 wherein the most recently identified shutoff angle is a valid shutoff angle and the fire angle immediately preceding the valid shutoff angle is a valid fire angle and wherein the method further includes the step of mathematically combining the valid shutoff angel and the valid fire angle to identify the preceding VZC angle.

13. The method of claim 12 wherein the step of combining the valid shutoff angle and the valid fire angle includes dividing the sum of the valid shutoff angle and the valid fire angle by two.

14. The method of claim 13 wherein the step of mathematically combining the most recent voltage zero crossing angle, the ZCD value and the notch period to determine the next firing angle include the step of mathematically combining the most recent voltage zero crossing angle and the ZCD value to provide a next virtual zero crossing (VZC) angle corresponding to the occurring half-cycle.

15. The method of claim 14 wherein the step of mathematically combining to provide the next VZC angle includes identifying the voltage zero crossing angle at the beginning of the occurring half-cycle as a most recent voltage zero crossing angle and adding the ZCD value to the most recent voltage zero crossing angle.

16. The method of claim 15 wherein the step of mathematically combining the most recent voltage zero crossing angle, the ZCD value and the notch period to determine the next firing angle further includes the step of subtracting the notch period from 180 degrees to provide a firing period and subtracting a fraction of the firing period from the next VZC angle to provide the next fire angle.

17. The method of claim 16 further including the step of identifying the firing period fraction by dividing the firing period by a factor of two.

18. The method of claim 16 further including the step of identifying the firing period fraction by receiving a notch control value between zero and one and multiplying the firing period by the notch control value.

19. The method of claim 1 further including the step of, for each half-cycle, firing the switching device at the next fire angle.

20. A method for operating a motor controller to cause balanced positive and negative current half-cycles in a motor phase, the motor controller utilizing switching devices to periodically connect a motor phase stator winding to a current source supply line in which each switching device enters a non-conductive state during a notch period of each alternating current half-cycle, each notch period beginning at a shut-off angle when current through the respective switching device becomes zero and ending at a fire angle when the respective switching device is again placed in a conductive state, the controller providing a desired notch period, the method comprising the steps of:

for an occurring half-cycle:
(a) identifying the most recently obtained valid shut-off angle;
(b) identifying the fire angle immediately preceding the identified shut-off angle;
(c) mathematically combining the identified fire angle and the identified shut-off angle to determine a next virtual zero crossing (VZC) angle;
(d) mathematically combining the next VZC angle and the notch angle to identify a fire angle for the occurring half-cycle; and
(e) repeating steps (a) through (d) for the next half-cycle as the occurring half-cycle.

21. The method of claim 20 wherein the step of mathematically combining to determine the next VZC angle includes performing a first process when the most recently occurring shut-off angle occurs in the occurring half-cycle and includes performing a second process when the most recently occurring shut-off angle occurs in other than the occurring half-cycle.

22. The method of claim 21 wherein the step of performing the first process includes adding the identified fire angle to a fraction of the difference between the identified fire angle and the identified shut-off angle to provide a preceding VZC angle corresponding to the half-cycle immediately preceding the current half-cycle and adding 180 degrees to the preceding VZC angle to identify a next VZC angle.

23. The method of claim 22 wherein the step of performing the second process includes identifying a most recent voltage zero crossing angle immediately preceding the occurring half-cycle, identifying a zero crossing delta (ZCD) value corresponding to the most recently obtained valid shutoff angle, the fire angle immediately preceding the most recently obtained shutoff angle and the voltage zero crossing angle immediately preceding the fire angle and adding the ZCD value to the most recent voltage zero crossing angle to identify the next VZC angle.

24. The method of claim 20 wherein the step of mathematically combining to determine the next fire angle includes subtracting the notch period from 180 degrees to provide a firing period and subtracting a fraction of the firing period from the next VZC angle.

25. An apparatus for operating a motor controller to cause balanced positive and negative current half-cycles in a motor phase, the motor controller utilizing switching devices to periodically connect a motor phase stator winding to a current source supply line in which each switching device enters a non-conductive state during a notch period of each alternating current half-cycle, each notch period beginning at a shut-off angle when current through the respective switching device becomes zero and ending at a fire angle when the respective switching device is again placed in a conductive state, the controller providing a desired notch period, the apparatus comprising:

a processor running a pulse sequencing program to perform the steps of:

for an occurring half-cycle:

(a) identifying the most recently obtained valid shut-off angle;

(b) identifying the fire angle immediately preceding the identified shut-off angle;

(c) mathematically combining the identified fire angle and the identified shut-off angle to determine a next virtual zero crossing (VZC) angle;

(d) mathematically combining the next VZC angle and the notch angle to identify a next fire angle for the occurring half-cycle; and (e) repeating steps (a) through (d) for the next half-cycle.

26. The apparatus of claim 25 wherein the program causes the processor to perform the step of mathematically combining to determine the next VZC angle by performing a first process when the most recently obtained shut-off angle occurs in the occurring half-cycle and includes performing a second process when the most recently occurring shut-off angle occurs in other than the occurring half-cycle.

27. The apparatus of claim 26 wherein the program causes the processor to perform the first process by adding the identified fire angle to a fraction of the difference between the identified fire angle and the identified shut-off angle to provide a preceding VZC angle that occurs during a preceding half-cycle and adding 180 degrees to the preceding VZC angle to provide the next VZC angle.

28. The apparatus of claim 27 wherein the program causes the processor to perform the second process by identifying a most recent voltage zero crossing angle immediately preceding the occurring half-cycle, identifying a zero crossing delta (ZCD) value corresponding to the most recently obtained valid shutoff angle, the fire angle immediately preceding the most recently obtained shutoff angle and the voltage zero crossing angle immediately preceding the fire angle and to the most recent voltage zero crossing angle to provide the next VZC angle.

29. The apparatus of claim 25 wherein the program causes the processor to perform the step of mathematically combining to determine the next fire angle by subtracting the notch period from 180 degrees to provide a firing period and subtracting a fraction of the firing period from the next VZC angle to identify the fire angle.

* * * * *